United States Patent [19]

Osborn

[11] Patent Number: 5,488,080
[45] Date of Patent: Jan. 30, 1996

[54] RUBBER AND PLASTIC BONDING

[75] Inventor: John D. Osborn, Wortham, Tex.

[73] Assignee: Encore Technologies, Inc., Houston, Tex.

[21] Appl. No.: 227,017

[22] Filed: Apr. 13, 1994

Related U.S. Application Data

[63] Continuation of Ser. No. 886,338, May 20, 1992, abandoned.

[51] Int. Cl.⁶ ............................. C08L 23/00; C08J 11/04
[52] U.S. Cl. ........................ 524/270; 524/274; 521/40.5
[58] Field of Search .................................. 524/270, 274; 521/40.5, 41, 43, 43.5, 44

[56] References Cited

U.S. PATENT DOCUMENTS

| | | | |
|---|---|---|---|
| 2,372,584 | 3/1945 | Kirby | 521/43 |
| 3,043,786 | 7/1962 | White | 521/43.5 |
| 4,481,335 | 11/1984 | Stark | 525/261 |
| 4,579,871 | 4/1986 | Linden et al. | 521/43 |
| 4,895,911 | 1/1990 | Mowdood et al. | 524/274 |

FOREIGN PATENT DOCUMENTS 0965177  7/1964  Canada ................ 521/43.5

*Primary Examiner*—Paul R. Michl
*Assistant Examiner*—Lavonda R. Dewitt
*Attorney, Agent, or Firm*—David M. Ostfeld

[57] ABSTRACT

A dry liquid concentrate mixture is disclosed comprising crumb rubber particles and tall oil, tall oil derivatives or other fatty acids, which may be enhanced by other components, such as modifiers, for use to enhance the properties of parent materials, such as thermoplastic compounding and coatings and elastomers and recycles and asphalt and epoxies and aliphatic urethane.

21 Claims, No Drawings

RUBBER AND PLASTIC BONDING

This is a continuation of application Ser. No. 886,338, filed May 20, 1992 now abandoned.

BACKGROUND OF PRIOR ART

The present invention relates generally to the utilization of scrap tires, and more particularly to the bonding of rubber and plastic material.

DESCRIPTION OF PRIOR ART

Each year there are an estimated 250,000,000 scrap tires discarded throughout the United States. Unwanted scrap tire piles, scattered throughout the country, have been estimated as high as 3 billion units. The poor biodegradability of scrap tires, their tendency to trap gases and rise to the surface in landfills, the serious fire hazard scrap tire piles represent, and the breeding environment that unwanted scrap tire piles offer to disease carrying pests, such as rodents and mosquitos, has caused them to be classified as a serious environmental nuisance.

Attempts to reuse the materials composing scrap tires have had very limited economic success. Many of these involve destructive distillation. The approaches to reuse, burn, or distill scrap tires appear not to have been commercially successful and had little effect on reducing either the flow or accumulation of scrap tire carcasses.

Truck tire carcasses with acceptable sidewall structure are recapped. The original tread stock of a used truck tire is removed by buffing. The resulting tire buffings, generated from the removal of the original tread stock, have been the primary feedstock material for the United States tire generated crumb rubber industry. This utilization, however, is limited in its scope and does not address the problem presented by scrap passenger or truck tire carcasses no longer suitable to be recapped.

Other methods of using scrap tire carcasses have included burning tire chips for BTU value and low and high vacuum pyrolysis to recover oil, carbon black, steel and fiber.

Several methods have been employed to enhance the value of scrap tire derived crumb rubber in vulcanized curing procedures. These methods are: polymeric coatings to enhance re-manufacture in rubber goods, addition of various quantities of tall oil derived fatty acids to adhere rubber particles into a useful mass, sulfur additions to act as a vulcanizing agent, and various complete devulcanization processes. Tire generated crumb rubber is also used in minimal percentages with virgin rubber as a filler and mixed with hot asphalt as a modifier.

Plastics is a multibillion-dollar industry which produces synthetic materials and products, many of which were never dreamed of only a few years ago. Today, civilization requires synthetic materials (artificial resins produced by chemical reactions of organic substances). Many products made of plastic produced materials are produced at less cost than was possible with natural materials.

Plastics, unlike glass or aluminum, are not easily recycled back into useful products, such as those which they were generated. Plastics, being a specifically engineered, rather than a generic material, are sorted prior to recycling. Plastics are seldom remanufactured back into the product or part which generated them. Often, recycled plastics are more expensive than new polymers. Examples of plastics which are recycled include: (1) HDPE and LDPE into boards, bins, and trash cans and (2) PET into carpet fiber. The markets for recycled plastics have been slow to develop and do not appear to be able to keep pace with the generation of new plastic materials. Once plastics are molded or spun, they lose some of the characteristics or properties of the virgin material. This creates a much bigger problem than scrap tires because the United States generates over 12 billion tons of scrap plastics per year, most of which is destined for deposit in landfills.

It would be desirable to develop cost feasible, raw material products generated from a whole scrap tire and plastic feed stocks, involving the crumb rubber produced from both the sidewall and tread materials. Because of the vast quantity of accumulated scrap tires and scrap plastics, it would be beneficial to broaden the market applications by forming new raw materials containing the combined properties of both crumb rubber and plastic.

It is well-known in the art to use tall oil with ground rubber waste for reuse as rubber. See "Ground Rubber Waste - A Supplementary Raw Material for the Rubber Industry" issued by Kahl & Co.; U.S. Pat. No. 4,481,335, issued Nov. 6, 1984 to Stark, Jr. entitled "Rubber Composition and Method"; U.S. Pat. No. 3,873,482, issued Mar. 25, 1975 to Severson et al, entitled "Pyrolyzed Tall Oil Products as Synthetic Rubber Tackifiers"; U.S. Pat. No. 4,895,911, issued Jan. 23, 1990 to Mowdood et al, entitled "Tall Oil Fatty Acid Mixture in Rubber"; U.S. Pat. No. 4,792,589, issued Dec. 20, 1988 to Colvin et al, entitled "Rubber Vulcanization Agents of Sulfur and Olefin"; and U.S. Pat. No. 4,224,841, issued Jan. 13, 1981 to Frankland, entitled "Method for Recycling Rubber and Recycled Rubber Product". Generally for the area of ground polymer elastomer operation, see U.S. Pat. No. 4,771,110, issued Sep. 13, 1988 to Bouman et al, entitled "Polymeric Materials Having Controlled Physical Properties and Purposes for Obtaining These"; and for rubber discussions see U.S. Pat. No. 3,544,492, issued Dec. 1, 1970, to Taylor et al, entitled "Sulfur Containing Curing Agents"; and "Organic Chemistry" by Fieser and Fieser printed 1944 by D. C. Heath & Co. Boston, pages 346 and 347.

SUMMARY OF THE INVENTION

The present invention is a dry liquid concentrate mixture in combination with organic and other components which dry liquid concentrate includes the base combination of: the major constituent crumb rubber, generated, for example, from processing the tread or sidewall of scrap tires, and a minor constituent of tall oil, its derivatives and other fatty acids. This combination forms the dry liquid concentrate mixture capable of acting as an impact modifier, homogenizing ingredient, extender, and viscoelastic modifier in a variety of non vulcanized cure systems for plastics and asphalt. The dry liquid concentrate mixture can also function as a carrying agent for additional plasticizing or compatibilizing chemicals to focus on specific applications.

The preferred dry liquid concentrate is a homogeneous blend of cured and shaped rubber particles that contain minimum moisture content and a liquid blend of tall oil, tall oil derivatives and other fatty acids. These liquid blends plasticize, swell, and soften the rubber particles, and allow the formation of chemical bonds between the rubber particle and asphalt, thermoplastics, thermoplastic elastomers, polyvinylchloride, polyacrylates, polyurethane coatings and binders, epoxies and other organic based compounds and is useful in thermoplastic reclamation.

The dry liquid concentrate mixture imparts elastomeric characteristics into the parent materials with which it is combined. Acting as an impact modifier, it helps to improve the modulus, elongation, and tensile strength, and changes the viscoelastic characteristics and helps to blend out crystalline spots in various high molecular weight polymers. Acting as a processing aid in polyethelylene and other polymeric reclamations, it homogenizes varieties of various molecular weight polymers together, imparting beneficial properties that even virgin polymers do not possess.

The dry liquid concentrate also adds the following captured and dispersed in the tire rubber: (1) carbon black, (2) ultra violet stabilizers, (3) heat stabilizers, (4) impact modifiers, and (5) antioxidants.

DESCRIPTIONS OF THE PREFERRED EMBODIMENT(S)

Cured rubber particles form one of the basic components of a dry liquid concentrate mixture used in the present invention. The cured rubber particles used are of natural or synthetic rubber, or the combination thereof, which has been substantially vulcanized or cured, as in the manufacture of automobile or truck tires. Truck and automobile tires constitute the main source of available, useful cured rubber particles. With respect to tires as a source of cured rubber particles, the dry liquid concentrate mixture is equally effective on the rubber generated from either the sidewall or tread of the scrap tire carcasses. Common rubbers useful for the dry liquid concentrate of the present invention includes, but are not limited to: NR, SBR, isoprene, EPDM, neoprene, nitrile, butyl, and ethylene-propylene diene rubbers. There is no need to separate the rubbers by polymer content. Crumb rubber produced from the sidewall or tread is acceptable as a component of the dry liquid concentrate of the present invention.

The rubber particles should be processed to be substantially free of contaminants, such as steel and fiber. For best results in thermally activated reactions, the rubber particles should contain minimum moisture content, which should be not more than 0.5% because the water will expand during manufacture.

| TIRE GENERATED CRUMB RUBBER PRODUCT ANALYSIS: (Whole Tire/Tread Stock Only) | | | |
| --- | --- | --- | --- |
| Product Analysis | Minimum | Maximum | Method |
| Acetone Extract | 10%/9% | 19%/17% | BTM-4-07 |
| Ash Content | —/— | 8.0%/7.0% | BTM-4-05 |
| Carbon Black Content | 28%/27% | 39%/38% | BTM-4-10 |
| Rubber Hydrocarbon | 42%/45% | —/— | |

Rubber particle shape and size are important elements of the rubber particles for use with the dry liquid concentrate mixture. The variety of processing systems designed to recover the available rubber particles from scrap tire carcasses include: granulation, stone grinding, cutting, sonic impacting, cracking, and cryogenic fragmentation. These various processing systems yield particles of different classes of size and shape. Granulation and cryogenic fragmentation yield particles with similar height, width, and depth dimensions, as well as a relatively smooth surface. Stone grinding, sonic impacting and cracking yield particles with greater surface area per mesh size and rough surface more conducive to the formation of mechanical bonds.

Rubber particles, regardless of the method of production, fall into four basic shape categories:

| | |
| --- | --- |
| CRYOGENIC MATERIALS: | Smooth Surface |
| ABRADED MATERIALS: | Rough Surface |
| TORN MATERIALS: | Rough Surface |
| CUT MATERIALS: | Smooth Surface but not as smooth as Cryogenic Materials |

The cured rubber particles maintain their memory of shape in all of the applications of the dry liquid concentrate mixture. Functional mesh size is determined by application. Rough surfaces, such as flake and oblong surfaces, of rubber particles will obtain greater mechanical bonds and add flexibility to materials in which they are used. Smooth surfaces, such as cubic rubber particles, are effective in adding the greatest resistance to abrasion and range of temperature to materials in which they are used.

Tall oil agents form another of the basic components of the dry liquid concentrate mixture used in the present invention. Tall oil agents may be any of Unitol DP-5, commercially available from Union Camp Corporation, NEO-SPANGOL T20, commercially available from Kahl & Co. and other formulations consisting of tall oil pitch, tall oil heads and dimer acid used without sulfur or a sulfur donor.

Tall oil, tall oil derivatives, and other fatty acids which fall within the following ranges of characteristics may be used in the dry liquid concentrate mixture:

| | |
| --- | --- |
| Viscosity, (centistokes at 99° C.) | 10 to 1000 |
| Acid Number, (Total) | 15 to 330 |
| Saponification Number | 10 to 350 |
| Fatty Acids, % | 5% to 100% |
| Rosin Acids, % | 0% to 70% |
| Unsaponifiables | 5% to 80% |

Mixing of the rubber particles with the tall oil agents is best accomplished by a dispersion mixing system, such as a ribbon blender; mastication is not required. Mixing can be done at ambient temperature, however pre-warming the rubber particles to approximately 80° C. and introducing of chemical agent formulations, such as the tall oil formulations, having a temperature of approximately 90° C. yield the fastest mixing cycle. Additional processing aids may also be used in the dry liquid concentrate mixture, such as, for example, pvc plasticizers, anti-strip agents for asphalt and polyethylene lubricants. These should be added to the tall oil formulations prior to mixture of the tall oil with the rubber particles. For best results, the dry liquid concentrate mixture should be allowed a twenty four hour standing time prior to usage. The dry liquid concentrate mixture is hydrophobic and the normal tendency of untreated crumb rubber to accumulate air-borne moisture is reduced. For most applications a 5 to 35 part per hundred by weight mix rate of the tall oil agent and other processing aids to the rubber particles is sufficient.

The formulations described above will effect virtually all sizes and shapes of cured rubber particles. The physical mesh size, shape and content of the cured rubber particles is determined by application requirements. For example, in an application of the dry liquid concentrate mixture with thermoplastics and thermoplastic elastomers, there are constraints related to extrusion nozzle size, mold entry ports, and the surface texture required on the end product. For this purpose, cubic, smooth shaped rubber particles as additions of equal weight and mesh size have less impact on the viscosity of blends of the dry liquid concentrate mixture with such plastics and elastomers than do flake or oblong, rough particles because the particle has less surface area.

Plastic compounding with a dry liquid mixture can be accomplished by either a strand extruder or an underwater pelletizer. However because of low green strength at the extruder nozzle masterbatch, compounds containing a composition of greater than 25% of treated crumb rubber are best achieved with the under water pelletizer.

Mixing of the dry liquid concentrate with parent materials other than thermoplastic, e.g., epoxies, urathanes, asphalt, latex, etc., should be done before application to another surface and should be accomplished by blending a quantity of the dry liquid concentrate mixture within the viscosity restraints required for the parent materials usage.

The dry liquid concentrate mixture enhances the snyergisim between the crumb rubber and the parent material which is not accomplished without the use of the tall oil, tall oil derivatives, and other fatty acids. This allows the crumb rubber particles to effectively impart their physical elastomeric qualities to, for example, plastics.

Other components which may be included in the dry liquid concentrate mixture during the application with the parent materials for various applications (because these components are in the rubber) are: (1) carbon black, (2) ultra violet stabilizers, (3) heat stabilizers, (4) impact modifiers, and (5) antioxidants.

APPLICATIONS

RUBBERIZED ASPHALT

The dry liquid concentrate mixture enables the use of crumb rubber as an asphalt binder modifier without the typical heat blending reaction cycle. Even dispersion of the dry liquid concentrate throughout the asphalt mixture is required. In asphalt-rubber hot mix, the dry liquid concentrate may be added either on the dry (rock aggregate side) or wet (heated, liquified asphalt) side of the mix prior to combining. In asphalt emulsions, the dry liquid concentrate should be meter blended into the emulsion, in the same manner as adding to the wet side discussed above.

| GRADUATIONS OF REQUIRED GROUND TIRE RUBBER (HOT MIX ASPHALT) | | | | |
|---|---|---|---|---|
| SIEVE SIZE % PASSING | Dense Graded Asphalt TYPE I | Open Graded Asphalt TYPE II | Gap Graded Asphalt TYPE III | Open or Dense Asphalt TYPE IV |
| 10 | 100 | 100 | 95–100 | 100 |
| 16 | 100 | 75–100 | — | — |
| 30 | 70–100 | 25–60 | 0–10 | 25–30 |
| 50 | — | — | 0–2 | 5–45 |
| 80 | 0–20 | 0–20 | — | — |
| 100 | — | — | — | 0–10 |
| 200 | 0–5 | 0–5 | — | — |

| DRY LIQUID CONCENTRATE % BY WEIGHT PER ASPHALT BINDER CONTENT | |
|---|---|
| TYPE I | 17%–26% |
| TYPE II | 17%–26% |
| TYPE III | 17%–26% |
| TYPE IV | 17%–26% |

| CHEMICAL TREATMENT (TALL OIL FOR EXAMPLE) RATIO BY RUBBER TYPE CHEMICAL TREATING AGENT % BY WEIGHT OF RUBBER | |
|---|---|
| TYPE I | 9%–28% |
| TYPE II | 9%–28% |
| TYPE III | 9%–28% |
| TYPE IV | 9%–28% |

In summary, asphalt modification (dry or wet applications) is accomplished with a. Rubber particle mesh sizes from less than 10 to greater than 200 depending upon application b. Dry liquid concentrate % by weight of 9%–28% depending upon application of asphalt binder After mixing the dry liquid concentrate made up as set out above with the asphalt binder, the mixture is added to rock for paving or is used without rock for crack seal and emulsions, such as for roofing material.

THERMOPLASTIC

The preferred method of utilizing the dry liquid concentrate mixture to modify thermoplastic involves the compounding of the respective thermoplastic with the dry liquid concentrate mixture. The preferred extruder is a twin screw system to insure proper dispersion of the respective thermoplastic with the dry liquid concentrate mixture. A single screw extruder may also be employed, however the feed system must be carefully metered to insure proper dispersion between the thermoplastic and the dry liquid concentrate. Dry mixing may also be employed, however even dispersion of the dry liquid concentrate mixture with the thermoplastic is required to assure part quality. The extruder is to be operated at the proper melt temperature for the various thermoplastic relative to the specific melt index of the plastic. The extruder temperature for most thermoplastic varieties will range between 300° F. to 600° F., and preferably 375° F. to 600° F.

| GRADUATIONS OF REQUIRED GROUND TIRE RUBBER FOR PLASTICS | | | | |
|---|---|---|---|---|
| SIEVE SIZE % PASSING | Coarse Rubber TYPE I | Medium Rubber TYPE II | Fine Rubber TYPE III | Ultra Fine Rubber TYPE IV |
| 20 | 100 | — | — | — |
| 30 | 80–100 | 100 | — | — |
| 40 | 50–80 | 80–95 | 90–100 | — |
| 60 | 0–10 | 40–65 | 60–80 | — |
| 80 | 0–5 | 0–20 | 40–65 | 85–100 |
| 100 | — | 0–5 | 15–25 | 65–90 |
| 200 | — | — | 0–5 | 10–25 |
| 400 | — | — | — | 10–25 |

The fineness of the rubber particles used will depend on the application.

| CHEMICAL TREATMENT (TALL OIL FOR EXAMPLE) RATIO BY RUBBER TYPE CHEMICAL TREATING AGENT % BY WEIGHT OF RUBBER | |
|---|---|
| TYPE I | 9%–28% |
| TYPE II | 9%–28% |
| TYPE III | 9%–30% |
| TYPE IV | 9%–35% |

The percentage of dry liquid concentrate mixture of the CHEMICAL TREATING AGENT Percentage Table above to thermoplastic is determined by application (part) requirement.

The chemical formulations of UNITOL DP-5, NEO-SPANGOL T20, and other formulations derived from tall oil, tall oil derivatives and other fatty acids are therefore used for mixture with crumb rubber particles with a moisture content, less than 0.5%, derived primarily from the processing of scrap tires to yield a dry liquid concentrate mixture capable of acting as an impact modifier, a viscoelastic modifier, homogenizing ingredient or an extender in:

1. Thermoplastic compounding (e.g., PE, PV, PET etc.) with
   a. Rubber particle mesh sizes from less than 20 to greater than 400 depending on application
   b. Dry liquid concentrate % by weight of 5%–85% depending on application of thermoplastic compounding
2. Thermoplastic coatings with
   a. Rubber particle mesh sizes from less than 80 to greater than 400 (Type III or IV) depending on application
   b. Dry liquid concentrate % by weight of 10%–60% depending on application of thermoplastic coating
3. Thermoplastic elastomers with
   a. Rubber particle mesh sizes from less than 20 to greater than 400 depending on application
   b. Dry liquid concentrate % by weight of 5%–70% depending on application of thermoplastic elastomers
4. Thermoplastic recycling with
   a. Rubber particle mesh sizes from less than 20 to greater than 400 depending on application
   b. Dry liquid concentrate % by weight of 5%–70% depending on application of recycled thermoplastic
5. Epoxies (grouting, compounding and coatings) with
   a. Rubber particle mesh sizes from less than 30 to greater than 200 (Type II, III or IV) depending on application
   b. Dry liquid concentrate % by weight of 5%–40% depending on application of epoxy
6. Coating composition made from an aliphatic urethane with 3%–60% by weight of treated rubber particles contained in the coating depending on application of a particle mesh size ranging from less than 30 to greater than 400 (Type III or IV).

The admixture of various processing aids for plastics, coatings, paints, etc. may also be used with rubber particles mixed with such tall oil, tall oil derivatives or other fatty acids where the dry liquid concentrate mixture is used as a carrying agent for these aids, such as PVC plasticizers where the dry liquid concentrate mixture may be used with a PVC plasticizer before introduction in the PVC.

In all of these circumstances, the ability is provided to increase the bonding properties of, for example, cubic rubber (e.g., cryogenic), with parent materials, such as plastics.

In thermally driven applications untreated rubber particles swell, soften, and exchange oils. Because of the high specific heat index of rubber, this usually requires an extended period of time (20 minutes to 60 minutes at temperatures ranging from 300° F. –600° F. degrees in asphalt). In Block mold applications using untreated rubber, the cooking time can be as long as 3 to 4 hours at over 400° F. to cause this action. Additives to the rubber may be impractical at these temperatures degrading the performance of the final product, such as a plastic and may render the process uneconomical because of mold cycle time.

The use of the dry liquid concentrate mixture begins this swelling and softening reaction without heat. When the dry liquid concentrate is added to parent materials, the normal heat viscosity curve, relative to the rubber, has been reduced allowing useful incorporation into parent materials determined by the parent materials heat index, thereby overcoming the problems of the prior art.

EXAMPLES

ASPHALT

An AC-20 asphalt may be blended with a 10–30 mesh ambiently produced crumb rubber (Type I or Type II). The crumb rubber is blended with 12% (by weight) of Unitol DP-5™. The resulting dry liquid concentrate mixture is blended into the asphalt at a temperature of 320 ° F. The jellified material from this blending is accomplished within a mix cycle of 5 minutes, instead of the typical 30 minute cycle and normal reaction temperature of 375° F.

An AC-30 asphalt binder may be mixed with a dense grade aggregate. The aggregate may be premixed with the dry liquid concentrate at a rate of 1.1% by weight of the dry liquid concentrate mixture to the aggregate (which for an aggregate of 92–95% by weight of the final asphalt binder and aggregate mixture thus yields 9%–28% of the dry liquid concentrate mixture to the asphalt binder). The crumb rubber, prior to chemical treatment, would have the following sieve sizes:

| U.S. Standard Sieve | % Retained |
| --- | --- |
| 10 | — |
| 30 | 50–70 |
| 50 | 70–95 |
| 100 | 95–100 |

The crumb rubber is blended with 11% (by weight) of Unitol DP-5™.

The resulting lab briquette contained an asphalt binder content of 6%. The briquette showed a 17% softening as a result of the dry liquid concentrate mixture addition, not known in the art.

THERMOPLASTIC

I. A whole tire generated ambiently may produce abraded crumb rubber with the following pre-treatment sieve size:

| U.S. Standard Sieve | % Retained |
| --- | --- |
| 20 | — |
| 30 | 20–45 |
| 50 | 70–90 |
| 80 | 95–100 |

The crumb rubber may be mixed with 12% (by weight of the rubber) of NEO-SPANGOL T-20™.

The dry liquid concentrate mixture may be dry mixed with recycled high density polyethylene in a 50%–50% by weight mix and injection molded in non-compounded form. A 500 ton nitrogen driven injection mold machine was used in this example. The injection mold machine was operated at temperature of 450° to 500° F.

The resulting molded part showed even dispersion of crumb rubber with excellent flow characteristics. Tensile was decreased by 6%, however, elongation, resistance to abrasion and the cold and hot temperature properties of the product were each increased by an average of 50%.

II A recycled HDPE dry liquid concentrate mixture may be prepared as follows:

Particle Rubber Sieve Size

| U.S. Standard Sieve | % Retained |
| --- | --- |
| 10 | — |
| 30 | 50–70 |
| 50 | 70–95 |
| 100 | 95–100 |

The crumb rubber is mixed with Unitol DP-5™ at a weight rate of 12% of the Unitol DP-5 to the crumb rubber. The dry liquid concentrate mixture is then mixed with recycled HDPE at a rate of 25% dry liquid concentrate mixture to the HDPE and then compounded through a strand extruder operating at a temperature of range of 450° F.–500° F. The resulting compound may then be injection molded at a temperature range of 450° F.–500° F. into a part (such as a pipe thread protector). The material showed excellent flow characteristics, even rubber distribution, no loss in tensile strength, increased resistance to abrasion and increased temperature properties.

III An ambient crumb rubber sample ranging in mesh size from not less 10 mesh to no greater than 50 mesh may be treated by weight with 10% Unitol DP-5™ to the crumb rubber. The dry liquid concentrate mixture may then be mixed with polyethylene film. The mix, by weight, would be 80% dry liquid concentrate mixture and 20% polyethylene film. The mixture may be placed into a cubic foot mold. The mold may be closed under five tons of pressure. The mold may then be placed into an autoclave oven and cooked at 400° F. for a period of three hours. The resulting block resembles a solid rubber unit. Core samples could be bent in half without breaking or tearing. Thus a rubber type material is produced without the need for sulphur or zinc oxide or accelerators in a non-vulcanized method while disposing of polyethylene film.

IV An ambient sample of crush rubber ranging from not less then 80 mesh to not more than 200 mesh may be treated with a tall oil pitch, tall oil heads and dimer acid, such as Unitol DP-5™, at a 10% weight ratio to the crumb rubber. The material may be mixed with thermoplastic copolymers at a ratio of 25% to 40% of dry liquid concentrate mixture to the thermoplastic copolymers. This mixture may then be applied with a specially designed flame thrower, such as manufactured by Plastic Flamecoat Systems, Inc. of League City, Tex. The resulting coating was applied to both steel and aluminum and showed excellent properties of adhesion. The coating was also electrically conductive.

V A cryogenic crumb rubber sample of not less than 60 mesh to not more than 200 mesh was treated with Unitol DP-5™ at a weight of 11% of Unitol DP-5™ to the crumb rubber. The dry liquid concentrate mixture was then compounded with virgin HDPE at a temperature range from 450° F.– 500° F. The compound mix was 25% dry liquid concentrate mixture and 75% virgin HDPE by weight.

The rubberized compound was then used at a 25% weight rate with virgin HDPE and extruded into a 40 mil sheet. The sheet exhibited no loss of tensile strength, however exhibited greater resistance to puncture and abrasion than non-rubberized HDPE.

Accordingly, because many varying and different embodiments may be made with the scope of inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A dry liquid concentrate mixture for use with organic compounds in nonvulcanized curing systems for plastics, recycled plastics, thermoplastics, thermoplastic elastomers, polyacrylics, polyurethanes, asphalt, and emulsions thereof, including latex, comprising a uniform mixture of:
    a. substantially dry crumb rubber including cured and shaped rubber particles;
    b. a liquid agent taken from the group consisting of fatty acids and tall oil pitches within the following ranges of characteristics:

| | |
| --- | --- |
| Viscosity, (centistokes at 99° C.) | 10 to 1,000 |
| Acid Number (Total) | 15 to 330 |
| Saponification Number | 10 to 350 |
| Fatty Acids, % | 5% to 100% |
| Rosin Acids, % | 0% to 70% |
| Unsaponifiables | 5% to 80%; | wherein the moisture content of said rubber particles and liquid agent is not more than 0.5%.

2. The mixture of claim 1 in which the particle size of the cured rubber particles is finer than about 10 mesh.

3. The mixture of claim 2 in which the cured rubber particles have a smooth surface.

4. The mixture of claim 2 in which the cured rubber particles have a rough surface.

5. The mixture of claim 1 wherein there is further included PVC plasticizers.

6. The mixture of claim 1 wherein about a 5 to 30 part per hundred by weight of liquid agent to cured rubber particles is used.

7. An improvement in treating compounds in nonvulcanized cure systems formulations that do not cure rubber or use sulfur or sulfur donors to crosslink, comprising incorporating into said compounds prior to curing a uniform mixture of:
    a. substantially dry cured and shaped rubber particles which have no more than 0.5% moisture content;
    b. a liquid agent taken from the group consisting of fatty acids and tall oil pitches within the following ranges of characteristics:

| | |
| --- | --- |
| Viscosity, (centistokes at 99° C.) | 10 to 1,000 |
| Acid Number (Total) | 15 to 330 |
| Saponification Number | 10 to 350 |
| Fatty Acids, % | 5% to 100% |
| Rosin Acids, % | 0% to 70% |
| Unsaponifiables | 5% to 80%; | wherein the moisture content of said rubber particles and liquid agent is not more than 0.5%.

8. A method of enhancing the cure of a compound selected from the group consisting of asphalt, plastics, thermoplastic elastomers, thermoplastics, epoxys, and polyurethanes which comprises adding a mixture of substantially dry cured and shaped rubber particles and a liquid agent taken from the group consisting of fatty acids and tall oil pitches within the following ranges of characteristics:

| | |
| --- | --- |
| Viscosity, (centistokes at 99° C.) | 10 to 1,000 |

| | |
|---|---|
| Acid Number (Total) | 15 to 330 |
| Saponification Number | 10 to 350 |
| Fatty Acids, % | 5% to 100% |
| Rosin Acids, % | 0% to 70% |
| Unsaponifiables | 5% to 80%; | wherein the moisture content of said rubber particles and liquid agents is not more than 0.5%.

9. A method for utilizing rubber scrap to yield a final product with non-rubber compounds material taken from the group consisting of asphalt, thermoplastics, thermoplastic elastomers, polyvinyl chloride, polyacrylates, polyurethanes and epoxys, comprising the steps of:

(1) preparing a dry liquid concentrate mixture by intimately mixing together substantially dry cured, shaped rubber particles and a liquid agent taken from the group consisting of fatty acids and tall oil pitches within the following ranges of characteristics:

| | |
|---|---|
| Viscosity, (centistokes at 99° C.) | 10 to 1,000 |
| Acid Number (Total) | 15 to 330 |
| Saponification Number | 10 to 350 |
| Fatty Acids, % | 5% to 100% |
| Rosin Acids, % | 0% to 70% |
| Unsaponifiables | 5% to 80%; | wherein the moisture content of said rubber particles and liquid agents is not more than 0.5%;

(2) mixing said dry liquid concentrate mixture with a non-rubber compound the material to form a uniform resultant mixture;

(3) treating the resultant mixture with heat energy to yield a product.

10. The method of claim 9 where step (1) includes mixing said rubber particles and liquid agent at a temperature above ambient.

11. The method of claim 10, wherein said temperature is at least 80° C. for said rubber particles and at least 90° C. for said liquid agent.

12. The method of claim 9, wherein about a 9 to 28 part per hundred by weight of liquid agent to cured rubber particles is used, the material is asphalt, and about 17 to 26 part hundred by weight of dry liquid concentrate mixture to asphalt is used.

13. The method of claim 9, wherein about a 5 to 35 part per hundred by weight of said liquid agent to cured rubber particles is used, the material is taken from the group consisting of thermoplastics and thermoplastic elastomers, and about a 5 to 85 part per hundred by weight of dry liquid concentrate mixture to thermoplastics and thermoplastic elastomers is used.

14. The method of claim 13, wherein said resultant mixture is extruded at a temperature of about 300° F. to 600° F.

15. The method of claim 14, wherein said temperature range is between 375° F. to 600° F.

16. The method of claim 15, wherein said thermoplastic is a thermoplastic coating and the dry liquid concentrate mixture to thermoplastic coating ratio is about in a range of 10% to 60% by weight of dry liquid concentrate mixture.

17. The method of claim 15, wherein said thermoplastic are thermoplastic elastomer and the dry liquid concentrate mixture to thermoplastic elastomer ratio is about in a range of 5% to 70% by weight of dry liquid concentrate mixture.

18. The method of claim 15, wherein said thermoplastic is a recycled thermoplastic and the dry liquid concentrate mixture to recycled thermoplastic ratio is about in a range of 5% to 70% by weight of dry liquid concentrate mixture.

19. The method of claim 9, wherein about a 9 to 28 part per hundred by weight of liquid agent to cured rubber particles is used, the material is an epoxy, and about a 5 to 40 part per hundred per weight of dry liquid concentrate mixture to epoxy is used.

20. The method of claim 9, wherein about a 9 to 28 part per hundred by weight of liquid agent to cured rubber particles is used, the material is a polyurethane, and about a 3 to 60 part per hundred by weight of cured rubber particles to polyurethane is used.

21. The method of claim 9, wherein step (1) includes mixing the liquid agent with PVC plasticizers.

* * * * *